(12) United States Patent
Yamane (10) Patent No.: US 9,911,444 B1
(45) Date of Patent: Mar. 6, 2018

(54) HEAD AND DISK DRIVE WITH THE SAME

(71) Applicant: Kabushiki Kaisha Toshiba, Minato-ku, Tokyo (JP)

(72) Inventor: Masami Yamane, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/454,291

(22) Filed: Mar. 9, 2017

Related U.S. Application Data

(60) Provisional application No. 62/382,870, filed on Sep. 2, 2016.

(51) Int. Cl.
*G11B 5/60* (2006.01)

(52) U.S. Cl.
CPC .................. *G11B 5/6082* (2013.01)

(58) Field of Classification Search
CPC ........................................... G11B 5/60
USPC ..................................... 360/236.4
See application file for complete search history.

(56) References Cited

U.S. PATENT DOCUMENTS

| | | | |
|---|---|---|---|
| 6,405,426 B1 * | 6/2002 | Kondo ................. | G11B 5/6005 29/603.12 |
| 6,999,282 B2 | 2/2006 | Rao | |
| 8,493,688 B2 | 7/2013 | Ambekar et al. | |
| 8,611,051 B1 * | 12/2013 | Hanyu ................. | G11B 5/6082 360/236.3 |
| RE46,121 E * | 8/2016 | Hanyu ................. | G11B 5/6005 |
| 2011/0032641 A1 * | 2/2011 | Ookubo ............... | G11B 5/6005 360/235.5 |

FOREIGN PATENT DOCUMENTS

JP 2011-040128 A 2/2011

* cited by examiner

*Primary Examiner* — Allen T Cao
(74) *Attorney, Agent, or Firm* — White & Case LLP (57) ABSTRACT

According to one embodiment, a head for a disk drive includes a slider including an air-bearing surface having a pair of side edges, a pair of side surfaces, a leading-side end surface and a trailing-side end surface, and a head section provided in the slider. The slider includes a leading step in a leading-side end portion of the air-bearing surface, a deep trench provided downstream side of the leading step, and a trailing step in a trailing side end portion of the air-bearing surface and including the head section built therein, and side trenches having a depth of 100 to 300 nm formed respectively along the pair side edges of the air-bearing surface.

11 Claims, 8 Drawing Sheets

FIG. 10 ating a head and a disk drive with the same

CROSS-REFERENCE TO RELATED APPLICATIONS

This application claims the benefit of U.S. Provisional Application No. 62/382,870, filed Sep. 2, 2016, the entire contents of which are incorporated herein by reference.

FIELD

Embodiments described herein relate generally to a head of a disk drive, and a disk drive with the same.

BACKGROUND

As a disk drive, for example, a hard disk drive (HDD) generally comprises a rotatable magnetic disk and a magnetic head (head) which reads/writes data with respect to the magnetic disk.

The magnetic head comprises a slider, and a head section provided in the slider, and the head section includes a reproduction element for reading and a recording element for writing. The slider includes a surface (air-bearing surface: ABS) opposing the recording surface of the magnetic disk. When the disk drive is in operation, an air flow is generated between the rotating magnetic disk and the slider, and a force (positive pressure) of flying the slider from the recording surface of the magnetic disk acts on the ABS of the slider by the principle of air fluid lubrication. By balancing the flying power and the head load, the slider is flying while maintaining a gap with respect to the recording surface of the magnetic disk.

In such a disk drive, if the inside of the drive is contaminated by dirt, dust, particles or the like, the contaminant is caught between the ABS of the slider and the surface of the magnetic disk, and the magnetic disk may be scratched. In order to reduce such damage, there have been proposed the so-called leading-fence ABS, in which a fence is provided in a leading portion of the slider, and a so-called particle-trap-hole ABS, in which the ABS and the step are formed to prevent a contaminant which has entered the disk from being caught therein.

However, in the former, the leading-fence ABS, the fence blocks inflow of air for maintaining the flying force of the slider, and thus the flying performance of the magnetic head degrades. Further, the leading-fence ABS can inhibit the entering of contaminants from the leading side, but contaminants can easily enter from the side of the slider.

The latter, the particle-trap-hole ABS has no such a structure to inhibit contaminants from entering, and therefore it is difficult to achieve the effect of preventing the catching of contaminants between the ABS and the disk surface if a contaminant enters from the side of the slider.

DETAILED DESCRIPTION

Various embodiments will be described hereinafter with reference to the accompanying drawings. In general, according to one embodiment, a head for a disk drive comprises: a slider comprising an air-bearing surface including a pair of side edges, a pair of side surfaces alongside the pair of side edges of the air-bearing surface, a leading-side end surface and a trailing-side end surface; and a head section in the slider, which records and reproduces data. The slider comprises a leading step provided in a leading-side end portion of the air-bearing surface, a deep trench provided downstream side of the leading step, and a trailing step provided in a trailing side end portion of the air-bearing surface and including the head section built therein, and side trenches having a depth of 100 to 300 nm formed respectively along the pair side edges of the air-bearing surface.

As a type of the disk devices, hard disk drives (HDDs) according to embodiments will now be described in detail.

Note that the disclosure is presented for the sake of exemplification, and any modification and variation conceived within the scope and spirit of the invention by a person having ordinary skill in the art are naturally encompassed in the scope of invention of the present application. Furthermore, a width, thickness, shape, and the like of each element are depicted schematically in the figures as compared to actual embodiments for the sake of simpler explanation, and they do not limit the interpretation of the invention of the present application. Furthermore, in the description and Figures of the present application, structural elements having the same or similar functions will be referred to by the same reference numbers and detailed explanations of them that are considered redundant may be omitted.

Figure 1:
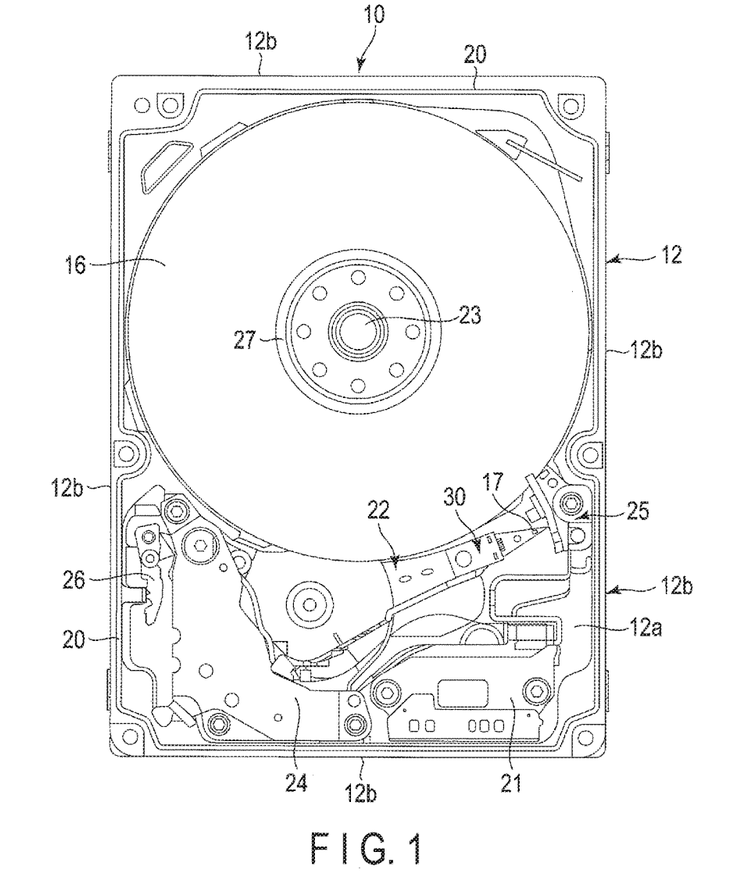
FIG. 1 is a plan view showing the internal structure of a hard disk drive (HDD) according to an embodiment.

FIG. 1 shows an internal structure of an HDD according to a first embodiment. As shown in FIG. 1, the HDD comprises a housing 10. The housing 10 comprises a base 12 formed in the shape of a rectangular box whose upper surface is open and a top cover (not shown) to cover the upper opening of the base 12. The base 12 comprises a rectangular bottom wall 12a and side walls 12b provided to stand along peripheral edges of the bottom wall 12a. In the housing 10 arranged are one or plural magnetic disks 16 as recording media, and a spindle motor 23 provided as a driving section which supports and rotates the magnetic disks 16. The magnetic disks 16 are engaged coaxially with a hub (not shown) of the spindle motor 18, clamped by a clamp spring 27, and thereby fixed to the hub. The magnetic disks 16 are rotated at a predetermined speed by the spindle motor 18 in a direction indicated by arrow A.

In the housing 10, a plurality of magnetic heads 17 and a carriage assembly 22 are provided. The magnetic heads 17 write/read data with respect to the magnetic disks 16. The carriage assembly 22 movably supports the magnetic heads 17 relative to the magnetic disks 16. In the housing 10 arranged are a voice coil motor (VCM) 24, a ramp load mechanism 25, a latch mechanism 26 and a board unit 21. The VCM 24 rotates and positions the carriage assembly 22, the ramp load mechanism 25 holds the magnetic heads 17 in unload positions separated from the magnetic disks 16 when the magnetic heads 17 are moved to the outermost circumferences of the magnetic disks 16, the latch mechanism 26 holds the carriage assembly 22 in a retreat position when an impact or the like acts on the HDD, and the board unit 21 comprises a conversion connector, etc.

A printed circuit board (not shown) is attached by screws to an outer surface of the bottom wall 12a of the base 12. The printed circuit board controls operations of the spindle motor 18, the VCM 24 and the magnetic heads 17 through the board unit 21.

Figure 2:
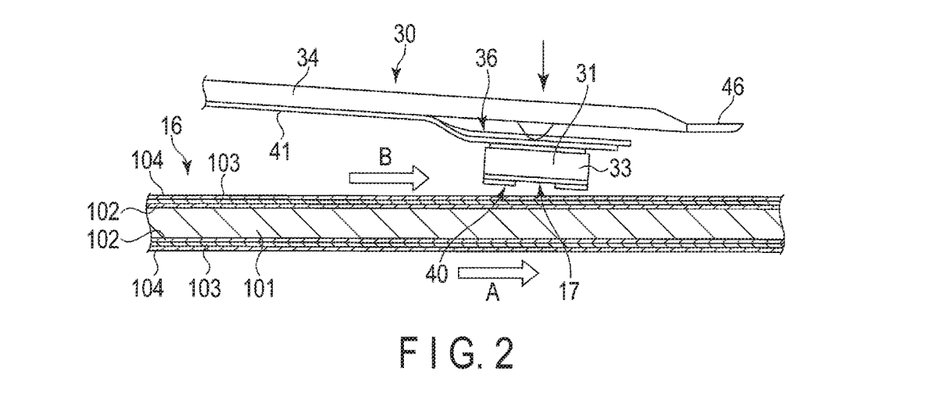
FIG. 2 is an enlarged side view showing a magnetic disk, magnetic head and suspension of the HDD.

FIG. 2 schematically shows the magnetic head in a flying state and the magnetic disks. As illustrated in FIGS. 1 and 2, the magnetic disks 16 each comprise, for example, a discoidal non-magnetic substrate 101 having a diameter of about 2.5 inches (6.35 cm). On both surfaces of the substrate 101, soft magnetic layers 102, magnetic recording layers 103 and protection film layers 104 are stacked in this order. The soft magnetic layers 102 are provided as underlying layers and formed of material exhibiting a soft magnetic characteristic.

The carriage assembly 22 includes a plurality of suspension assemblies 30. The suspension assemblies 30 each include a slender flat spring-shaped suspension 34 and a flexure 41 provided as a wiring trace on the suspension 34. Each magnetic head 17 is supported on a distal end portion of the respective suspension assembly 30 by a gimbal portion 36 of the flexure 41.

As shown in FIG. 2, the magnetic head 17 is formed as a flying-type head and comprises a slider 31 formed into a substantially rectangular parallelepiped shape and a head section 33 formed in an end portion on the (trailing) side of an outflow end of the slider 31. The slider 31 comprises an air bearing surface (ABS) 40 opposing the surface of the respective magnetic disk 16. Each magnetic head 17 is flied by airflow B which is generated between a surface of the respective magnetic disk 16 and the ABS 40 of the slider 31 by rotation of the respective magnetic disk 16. The direction of airflow B is coincident with a rotating direction of the magnetic disk 16.

Figure 3:
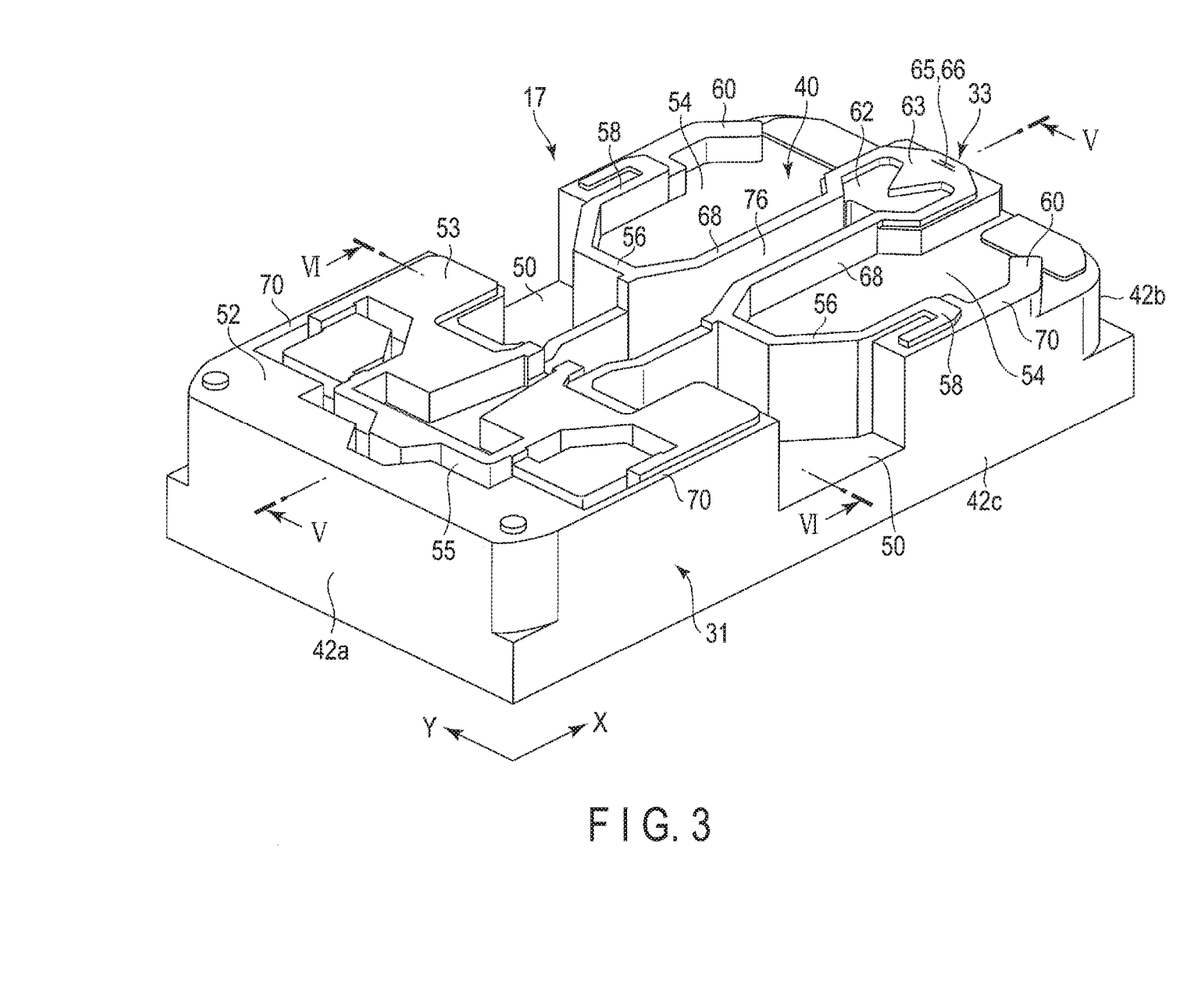
FIG. 3 is a perspective view showing the magnetic head from an air bearing surface (ABS) side.

Now, the structure of the magnetic heads 17 will be explained in detail. FIG. 3 is a perspective view showing the slider of the magnetic head, and FIG. 4 is a plan view of the magnetic head from an ABS side.

Figure 4:
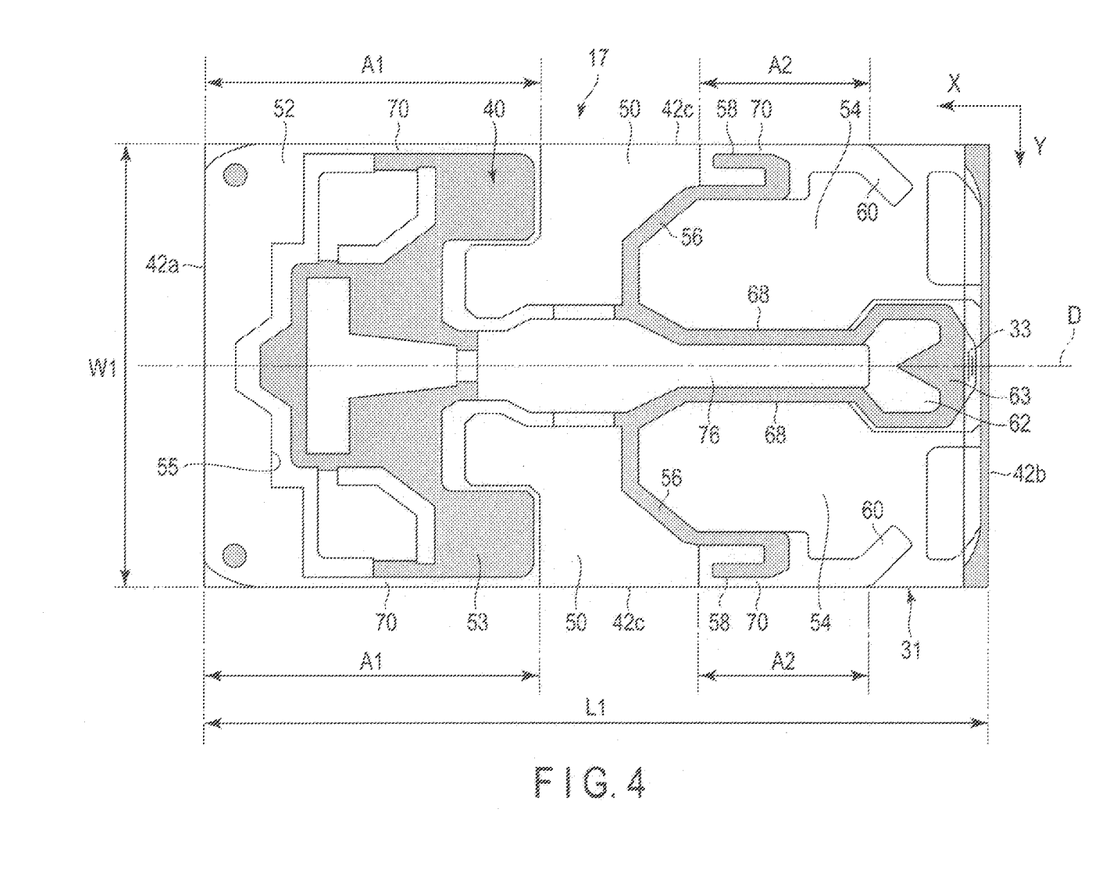
FIG. 4 is a perspective view showing the magnetic head from the ABS side.

As shown in FIGS. 2, 3 and 4, the slider 31 of the magnetic head 17 is formed into substantially a rectangular parallelepiped shape, and includes the rectangular air bearing surface (ABS) 40 opposing to the surface of the magnetic disk 16, an inflow-side end surface (leading-side end surface) 42a extending to perpendicularly intersect the ABS 40, an outflow-side end surface (trailing-side end surface) 42b extending to perpendicularly intersect the ABS 40 and a pair of side surfaces 42c each extending between the inflow-side end surface 42a and the outflow-side end surface 42b to perpendicularly intersect the ABS 40.

Here, the longitudinal direction of the ABS 40 is defined as a first direction X, and the width direction intersecting therewith is defined as a second direction Y. The slider 42 is formed as the so-called femto-slider having a length L1 in the first direction X of 1.25 mm or less, for example, 1.235 mm, a width W1 in the second direction Y of 1.0 mm or less, for example, 0.7 mm and a thickness T1 of 0.18 to 0.3 mm.

Figure 5:
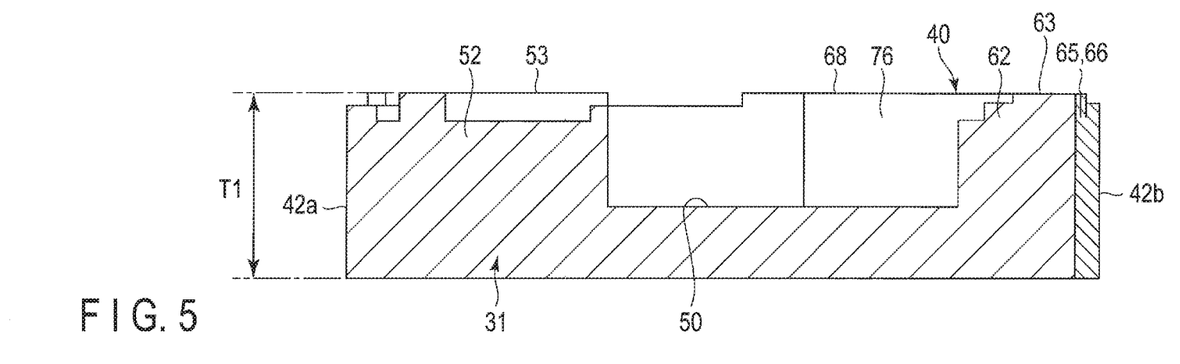
FIG. 5 is a cross sectional view of the magnetic head taken along line V-V in FIG. 3.
Figure 6:
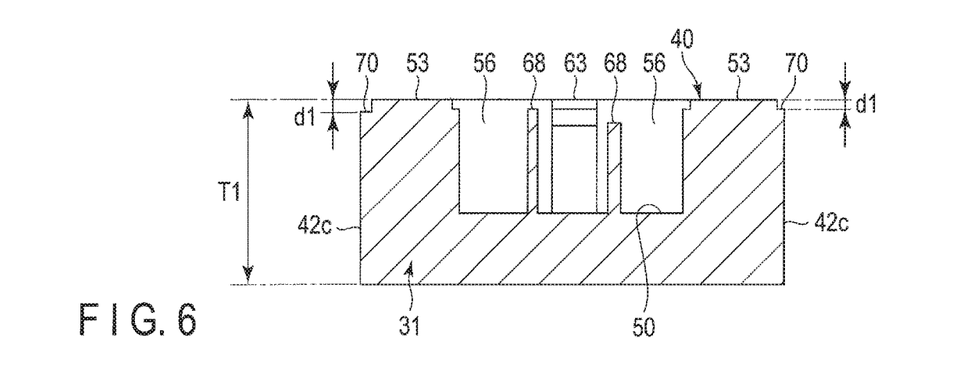
FIG. 6 is a cross sectional view of the magnetic head taken along line VI-VI in FIG. 3.

FIG. 5 is a longitudinal section of the slider taken along line V-V of FIG. 3, and a transverse cross section thereof taken along line VI-VI of FIG. 3.

As shown in FIGS. 3 to 5, a belt-shaped negative pressure generating trench (deep trench) 50 is formed in approximately a central portion of the ABS 40 and extends over an entire width thereof in the second direction Y. When the thickness T1 of the slider 31 is set to, for example, 0.18 mm, the negative pressure generating trench 50 has a depth of 1 to 5 μm, for example, 3 μm. With the negative pressure generating trench 50 provided, negative pressure can be generated in the central portion of the ABS 40 in all yaw angles of the magnetic head 17 realized by the HDD.

In the leading-side end portion of the ABS 40, a leading step 52 of substantially a rectangular shape is formed. The leading step 52 is formed to project from the bottom of the negative pressure generating trench 50, and is located in the inflow side of the negative pressure generating trench 50 with respect to the air flow C.

On the leading step 52, a leading pad 53 which supports the slider 31 with an air film is provided to project therefrom, thereby maintaining the pitch angle of the magnetic head 17. The leading pad 53 is formed in an M shape which has a plurality of openings opened toward the inflow side. An upper surface of the leading pad 53 constitutes the uppermost surface of the slider 31 and constitutes a part of the ABS 40. A negative pressure generating trench 55 is formed in the leading step 52 at a position slightly shifted to the outflow side from the inflow end of the leading step 52.

As shown in FIGS. 3 to 5, a negative pressure cavity 54, which is a recess, is formed in the ABS 40 from its approximately central portion over to the outflow-side end surface 42b. The negative pressure cavity 54 is located in the outflow end side of the negative pressure generating trench 50 and is opened toward the outflow-side end surface 42b. The negative pressure cavity 54 is shallower than the negative pressure generating trench 50, that is, it is located in a position higher than the bottom of the negative pressure generating trench 50. The negative pressure cavity 54 has a depth of 500 to 1500 nm, for example, 1000 nm. With the negative pressure cavity 54 formed, negative pressure can be generated in the central part of the ABS 40 in all yaw angles of the magnetic head realized by the HDD.

In the ABS 40, a rib-shaped middle step 56, a pair of side steps 58 and a pair of skirts 60 are formed so as to enclose the negative pressure cavity 54. The middle step 56 is located between the negative pressure generating trench 50 and the negative pressure cavity 54 and extends between the both side edges of the ABS 40 in the second direction Y. The middle step 56 projects from the bottom of the negative pressure cavity 54 and is located in the inflow side of the negative pressure cavity 54 with respect to the air flow C.

The pair of side steps 58 are formed along the respective side edges of the ABS 40 and extended from the middle step 56 to the outflow end side of the ABS 40. The side steps 58 project from the bottom of the negative pressure cavity 54.

The pair of skirts 60 are formed along the respective side edges of the ABS 40 and extended from the side steps 58 to the vicinity of the outflow side end surface 42b of the ABS 40 in the first direction X. Each skirt 60 is formed to project from the bottom of the negative pressure cavity 54 but formed lower than the respective side step 58.

The middle step 56, the pair of side steps 58, the pair of skirts 60 are arranged to form approximately a U shape, in which the upper stream side is closed and the lower stream side is opened. Thus, the negative pressure cavity 54 is defined by the middle step 56, the side steps 58 and the skirts 60.

As shown in FIGS. 3 to 6, the slider 31 comprises a trailing step 62 formed in the outflow side end of the ABS 40 with respect to the direction of the air flow C. The trailing step 62 is formed to project from the bottom of the negative pressure cavity 54 and the projection height thereof is the same as that of the leading step 52. The trailing step 62 is located substantially at the center of the ABS 40 along the second direction Y. On the upper surface of the trailing step 62, a trailing pad 63 which supports the slider 31 by an air film is formed to project therefrom.

The trailing pad 63 is located on the outflow side end surface of the trailing step 62, that is, an inflow side with respect to the outflow side end surface 42b of the slider 31 with a gap. The trailing pad 63 is formed to have the same height level as that of the leading pad 53, the center steps 56, and the side steps 58, so as to constitute the uppermost surface of the slider 31, which is a part of the ABS 40.

The head section 33 of the magnetic head 17 includes a recording element 65 and a reproduction element 66 which record/reproduce data with respect to the magnetic disk 16. The record element 65 and the reproduction element 66 are embedded in the downstream side end portion of the slider 31 with respect to the direction of the air flow C, that is, in the trailing step 62. The distal end portions of the recording element 65 and the reproduction element 66 are exposed to the ABS 40 at the position of the trailing pad 63.

The ABS 40 of the slider 31 comprises a pair of elongated center rails 68 extending from the middle step 56 to the trailing step 58 in the first direction X. The pair of center rails 68 are located respectively on both sides of a central axis D of the slider 31 to oppose each other with a gap interposed therebetween in the second direction Y. The center rails 68 are formed to have a height from the bottom of the negative pressure cavity 54, which is the same as that of the middle steps 56 and the trailing pad 63. Between the pair of center rails 62, a guide trench 76 is formed so as to guide air flow to the trailing step 62 and the trailing pad 63. The guide trench 76 is formed along the central axis D, passing through the negative pressure generating trench 50 to further extend to the leading step 52.

Further, according to this embodiment, shallow trenches (side trenches) 70 are formed respectively on both side edges of the ABS 40 to respectively extend therealong.

On both side edges of the ABS 40, the shallow trenches 70 are formed over regions of a length A1 from the inflow-side end surface 42a of the slider 31 to the outflow-side end of the leading step 52 and a length A2 from the inflow-side end of the side steps 58 to middle portions of the skirts 60. The length A1 of each shallow trench 70 on the inflow end side is set to be 30% or more, for example, 40% of a full length L1 of the slider 31. Similarly, the length A2 of each shallow trench 70 on the outflow side is set to be 30% ore more, for example, 30% of the full length L1 of the slider 31.

The shallow trench 70 has a depth d1, for example, 100 to 300 nm, which is about 1/1000 of the height (thickness T1) of the slider 31. Thus, the regions of the side surfaces 42c of the slider 31 in the height direction (the thickness direction) constitute the slider 31 while approximately the entire surface thereof remains except for those of the shallow trenches 70. Therefore, it is possible to obtain the slider 31 with the side surfaces 42c having a great height (thickness).

According to the magnetic head 17 of the HDD having the above-described structure, the shallow trenches 70, which are very shallow as having a depth d1 of 100 to 300 nm, are formed respectively on both side edges of the ABS 40. With this structure, the side surfaces of the slider 31 can be made higher as compared to the conventional techniques and the gap between the side surfaces of the slider and the surface of the magnetic disk can be greatly reduced.

Therefore, it is possible to inhibit contaminants such as particles from entering from the side surfaces 42c of the slider 31, thereby to suppress the occurrence of damage to the magnetic head and/or the magnetic disk. When such a shallow trench 70 is applied to a slider (channel type) in which a deep trench is formed in the ABS, even a greater effect, i.e., the contaminants invasion prevention effect, can be obtained.

In the side edge of the ABS 40 of the slider 31, burrs are easily created during processing the slider. Therefore, it is necessary to carry out the milling of the side edges to a certain depth. Conventionally, in many cases, burrs are removed by forming 1 to 5 μm-deep grooves in the side edges of the sliders. By contrast, in this embodiment, the shallow trenches 70 are formed by milling to have a depth d1 of 100 to 300 nm. With such shallow trenches 70, it is possible to inhibit the entering of contaminants such as particles of a comparatively large size as 1 μm or more without reducing the performance (flying performance) of the ABS 40. Therefore, both a high resistance to contamination and a high ABS performance can be achieved.

Note that in the first embodiment, the length of the shallow trench 70 is set to (A1+A2), which is set to about 70% of the full length L1 of the slider 31, but the embodiment is not limited to this. As long as the length of the shallow trenches 70 is set to 30% or more of the full length L1 of the slider, an advantageous effect similar to that described above can be obtained. In this case, it is preferable that the shallow trenches 70 to be provided at least in an inflow-side end surface 42a side of the slider 31.

Next, an HDD according to another embodiment will be described. In the following explanation of the embodiment, members that are the same as those of the first embodiment will be given the same reference numbers and their detailed explanation will be omitted. Only the members that are different from those of the first embodiment will be mainly explained in detail.

Second Embodiment

Figure 7:
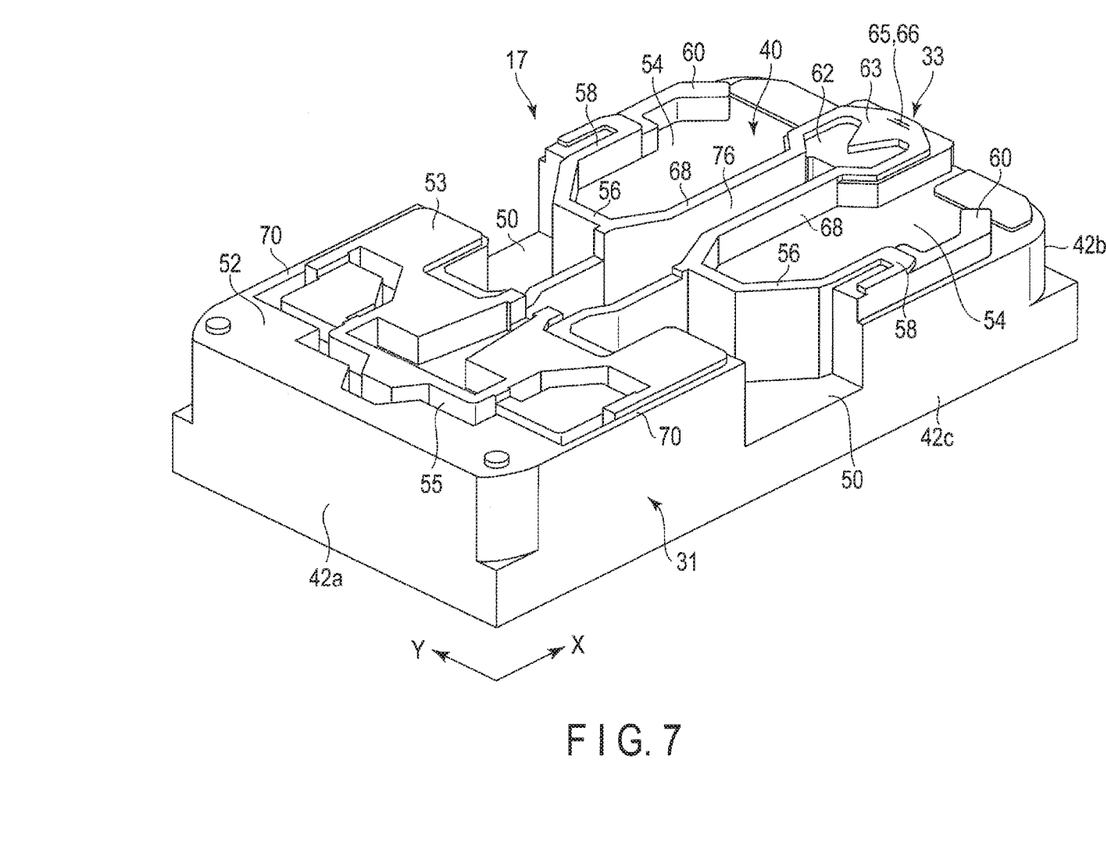
FIG. 7 is a perspective view showing a magnetic head from an air bearing surface (ABS) side in an HDD of according to the second embodiment.
Figure 8:
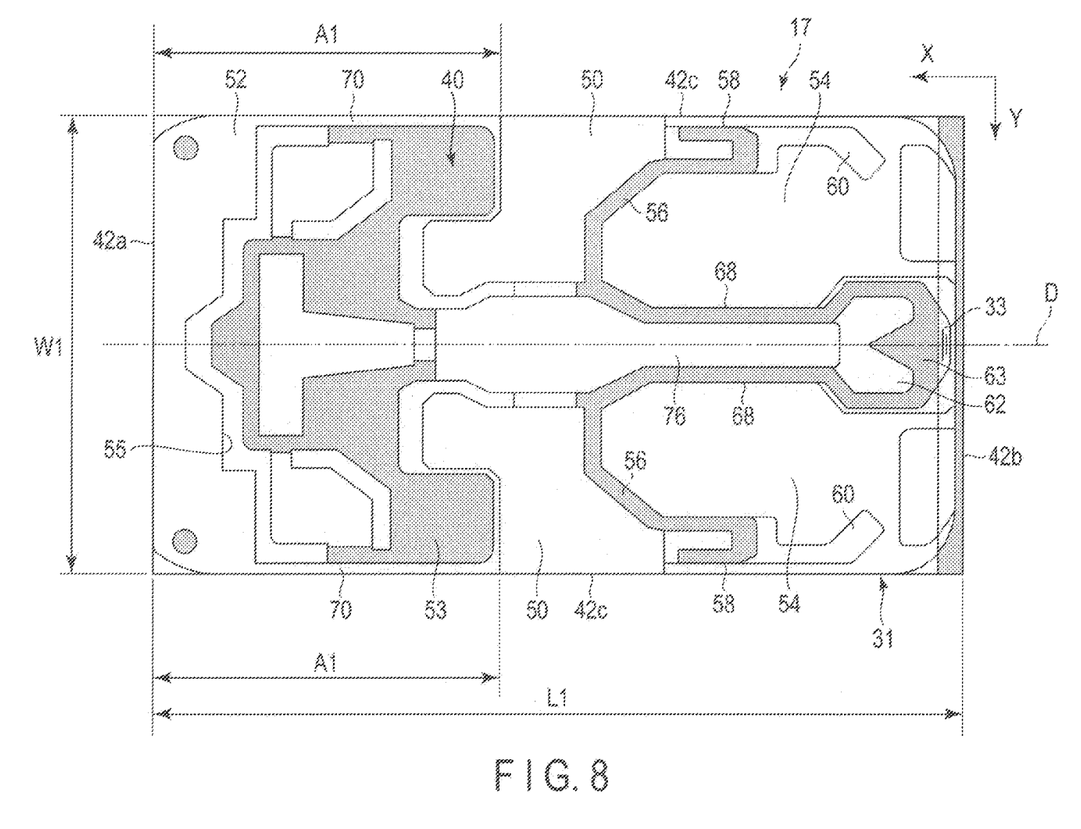
FIG. 8 is a plan view showing the magnetic head from the ABS side.

FIG. 7 is a perspective view of a magnetic head of an HDD according to a second embodiment. FIG. 8 is a plan views showing the magnetic head from the ABS side.

As shown in FIGS. 7 and 8, according to the second embodiment, in the ABS 40 of the slider 31, 100 to 300 nm-deep shallow trenches 70 are provided only in an inflow-side end 42a side of the side edges. Each shallow trench 70 extends only the length A1 toward the central portion of the slider 31 from the respective inflow-side end surface 42a. The length A1 is set to 30% or more, for example, 40% of the full length L1 of the slider 31. On an outflow-side end surface 42b side of the side edges, deep trenches are respectively formed in place of the shallow trenches in the ABS 40.

In the second embodiment, the other structure of the magnetic head 17 is the same as that of the first embodiment.

Even in the case where the shallow trenches 70 are formed only in the inflow-side end 42a side of each side edge, an advantageous effect similar to that of the first embodiment can be obtained. That is, the entering of contaminants such as particles from the side surfaces of the slider can be inhibited, and thus it is possible to provide a magnetic head and an HDD which can achieve both a high resistance to contamination and a high ABS performance.

Third Embodiment

Figure 9:
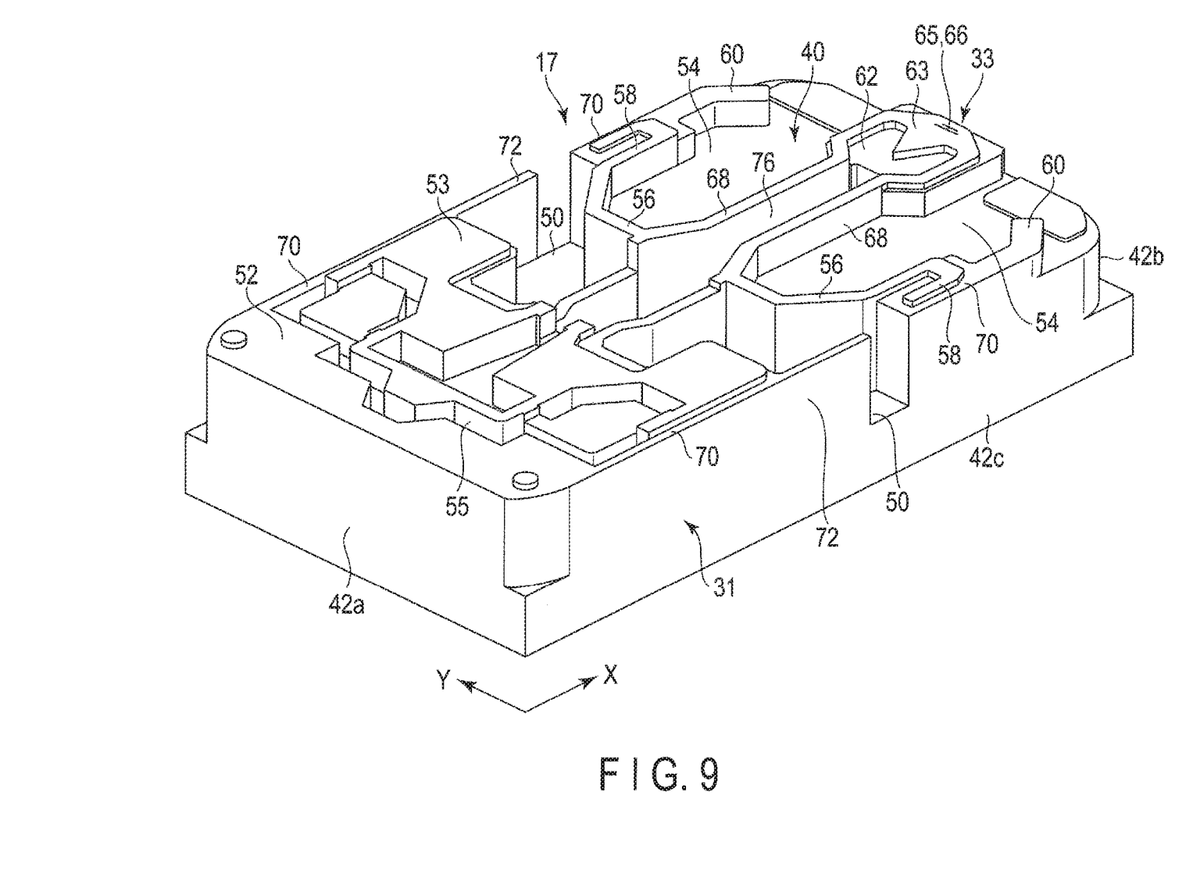
FIG. 9 is a perspective view showing a magnetic head from an air bearing surface (ABS) side in an HDD of according to the third embodiment.
Figure 10:
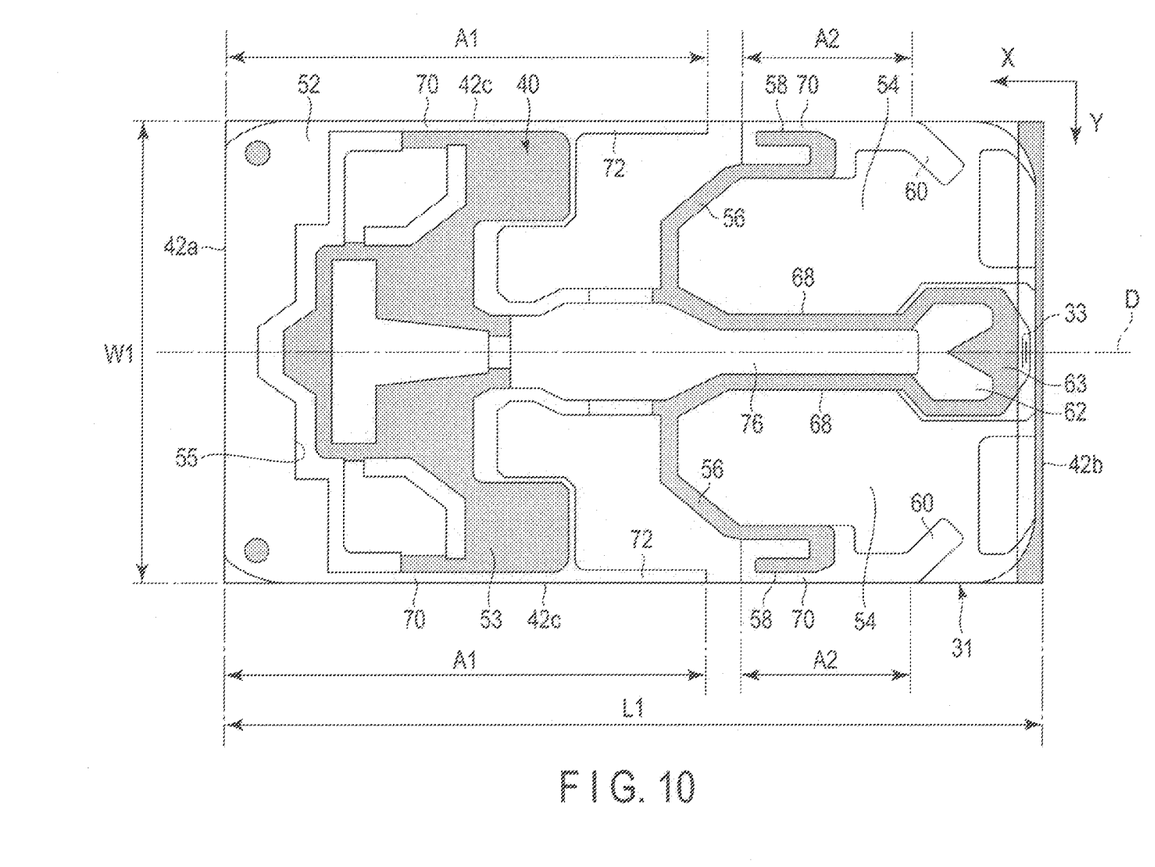
FIG. 10 is a plan view showing the magnetic head from the ABS side.

FIG. 9 is a perspective view showing a magnetic head of an HDD according to a third embodiment and FIG. 10 is a plan view showing the magnetic head from an ABS side.

As shown in FIGS. 9 and 10, according to the third embodiment, the slider 31 comprises a pair of skirts 72 extending from both lateral ends of the leading step 52 along the side edges of the slider 31, respectively, towards the outflow end thereof. Each of the skirts 72 has the same height as that of the shallow trench 70.

Thus, in each of the side edges of the ABS 40, the 100 to 300 nm-deep shallow trench 70 is formed over a length A1 from the inflow side end surface 42a to the extending end of the skirt 72. Further, as the shallow trench 70 having the length A1, and the shallow trench 70 on the outflow end side, having the length A2 are united, the shallow trench 70 having the length (A1+A2) can be formed to cover 70% or more of the full length L1 of the slider 31.

In the third embodiment, the other structure of the magnetic head 17 is the same as that of the first embodiment described above.

Thus, the shallow trenches 70 are each formed to cover 70% or more of the full length L1 and thus the side edges of the ABS 40 are covered more by the shallow trenches 70. With this structure, it is possible to inhibit the entering of contaminants such as particles from the side surfaces of the slider more effectively. Moreover, only the skirts 72 are extended without extending the entire leading step 52 to the outflow end side, it is possible to extend the shallow trenches 70 without significantly varying the flying performance of the slider 31. Thus, it is possible to provide a magnetic head and an HDD which can achieve both a high resistance to contamination and a high ABS performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the slider of the magnetic head is applicable to not only a femto-slider but also a pico-slider, a PEMTO slider, or a slider of larger dimensions. The shape, size or the like of the trailing step, trailing pad or the other portions in the slider can be modified as needed. Further, in the disk drive, the size of the magnetic disks is not limited to 2.5 inches, but may be some other size. The number of magnetic disks is not limited to 2, but may be 1, 3 or more, in which case, the number of suspension assemblies may be decreased or increased according to the number of magnetic disks. The material and the dimensions of the suspension assembly are not limited to those of the embodiments, but can be modified in various ways as needed.

What is claimed is:

1. A head for a disk drive comprising:
a slider comprising an air-bearing surface including a pair of side edges, a pair of side surfaces alongside the pair of side edges of the air-bearing surface, a leading-side end surface and a trailing-side end surface; and
a head section in the slider, which records and reproduces data,
the slider comprising a leading step provided in a leading-side end portion of the air-bearing surface, a deep trench provided downstream side of the leading step, and a trailing step provided in a trailing side end portion of the air-bearing surface and including the head section built therein, and side trenches having a depth of 100 to 300 nm formed respectively along the pair side edges of the air-bearing surface, each of the side trenches opening to the air-bearing surface and the side surface.

2. The head of claim 1, wherein
each of the side trenches is formed to have a length of 30% or more of a full length of the slider.

3. The head of claim 1, wherein
each of the side trenches extends from the leading-side end surface toward the trailing side end surface.

4. The head of claim 1, wherein
the slider comprises a pair of skirts which extend from the leading step towards the trailing side end surface and are provided alongside the side surfaces, respectively, and
each of the side trenches extends from the leading-side end surface to an extending end of the respective skirt.

5. The head of claim 1, wherein
the depth of the deep trench of the slider is 1 to 5 μm.

6. A disk drive comprising:
a rotatable disk recording medium comprising a recording layer; and
the head of claim 1, configured to process data with respect to the recording medium.

7. The disk drive of claim 6, wherein
each of the side trenches has a length of 30% or more of a full length of the slider.

8. The disk drive of claim 6, wherein
each of the side trenches extends from the leading-side end surface toward the trailing side end surface.

9. The disk drive of claim 6, wherein
the slider comprises a pair of skirts which extend from the leading step towards the trailing side end surface and are provided alongside the side surfaces, respectively, and
each of the side trenches extends from the leading-side end surface to an extending end of the respective skirt.

10. A head for a disk drive comprising:
a slider comprising an air-bearing surface including a pair of side edges, a pair of side surfaces alongside the pair of side edges of the air-bearing surface, a leading-side end surface and a trailing-side end surface; and
a head section in the slider, which records and reproduces data,
the slider comprising a leading step provided in a leading-side end portion of the air-bearing surface, a deep trench provided downstream side of the leading step, a trailing step provided in a trailing side end portion of the air-bearing surface and including the head section built therein, a pair of skirts which extend from the leading step towards the trailing side end surface and are provided alongside the side surfaces, respectively, and side trenches having a depth of 100 to 300 nm formed respectively along the pair side edges of the air-bearing surface, each of the side trenches extending from the leading-side end surface to an extending end of the respective skirt.

11. A disk drive comprising:
a rotatable disk recording medium comprising a recording layer; and
a head configured to process data with respect to the recording medium;
the head comprising:
a slider comprising an air-bearing surface including a pair of side edges, a pair of side surfaces alongside the pair of side edges of the air-bearing surface, a leading-side end surface and a trailing-side end surface; and
a head section in the slider, which records and reproduces data,
the slider comprising a leading step provided in a leading-side end portion of the air-bearing surface, a deep trench provided downstream side of the leading step, a trailing step provided in a trailing side end portion of the air-bearing surface and including the head section built therein, a pair of skirts which extend from the leading step towards the trailing side end surface and are provided alongside the side surfaces, respectively, and side trenches having a depth of 100 to 300 nm formed respectively along the pair side edges of the air-bearing surface, each of the side trenches extending from the leading-side end surface to an extending end of the respective skirt.

* * * * *